No. 830,576. PATENTED SEPT. 11, 1906.
H. E. DECKEBACH.
PROCESS OF TREATING AND AGING WORT.
APPLICATION FILED SEPT. 4, 1902.
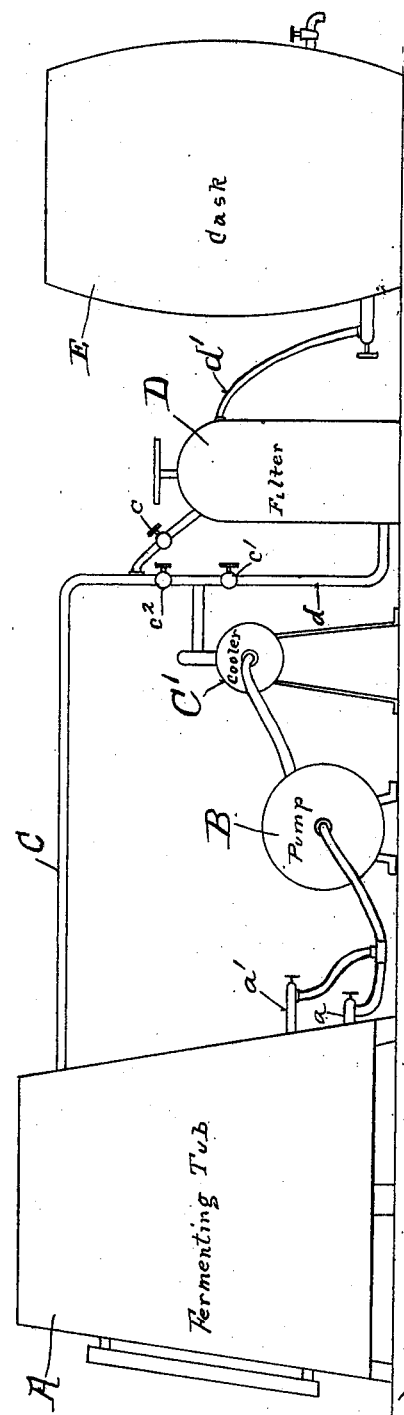

UNITED STATES PATENT OFFICE.

HENRY E. DECKEBACH, OF CINCINNATI, OHIO.

PROCESS OF TREATING AND AGING WORT.

No. 830,576. Specification of Letters Patent. Patented Sept. 11, 1906.

Application filed September 4, 1902. Serial No. 122,114.

*To all whom it may concern:*

Be it known that I, HENRY E. DECKEBACH, a citizen of the United States of America, and a resident of Cincinnati, county of Hamilton, State of Ohio, have invented certain new and useful Improvements in Processes of Treating and Aging Wort, of which the following is a specification.

The object of my invention is a process of fermenting and aging wort which does away with the necessity either of the aplication of the kraeusen process to the beer or of injecting therein carbonic-acid gas, and which likewise may be carried on in much less time than these processes.

The figure is a side elevation of an apparatus by which my process may be carried on.

In the processes now used for treating wort the wort is allowed to remain in contact with the yeast until a full fermentation has taken place, which requires several days. During this time all the carbonic-acid gas has been taken out of the beer by the exposure to the air. To give the necessary amount of carbonic-acid gas to the beer, the process of kraeusen is sometimes used, which consists in adding to the aged beer a quantity of new or unfermented beer, which adds the desired quantity of gas thereto. Another way is to inject the carbonic-acid gas into the beer after it has been aged. With my process neither of these steps is necessary. I place the yeast in the wort when the wort is at a temperature of 42° Fahrenheit or at any temperature between 42° and 47°. I allow fermentation to go on until it has reached approximately 55° Fahrenheit, which will take only a few hours. Then I stop the fermentation by cooling the wort to approximately 32° Fahrenheit. Then I fine the same in its cooled condition in a chip-cask by allowing it to rest for about two hours. It is then filtered. Any old-style loose-pulp filter, such as the well-known filter for which United States Letters Patent No. 367,212 were granted to Johann Klein, may be used for filtering. This filtering takes out the large particles of yeast which are floating in the wort, but leaves a quantity of finely-divided yeast floating about in it. I then put it into casks and bung it and store it in a cellar of a warmer temperature, preferably from 42° to 50° Fahrenheit. In this warmer temperature a second fermentation takes place, which disintegrates the finely-divided yeast and creates the necessary amount of carbonic-acid gas and ripens or ages the beer in a short while. This fermentation should go on until a gage inserted into the cask indicates a pressure of ten pounds above atmospheric pressure. The beer is then ready for use. It contains all the necessary gas and is free from any yeast taste. This yeast taste is one which is often found in beers treated by the old processes by reason of their remaining so long in contact with the large quantity of yeast and creates the necessity of aging them for a considerable time after having been clarified in a cold temperature in order to get rid of this taste.

In the accompanying drawing I have illustrated in side elevation an apparatus by means of which my process may be carried out.

A is the fermenting-tub, in which the first fermentation takes place.

B is a pump which carries the liquid through a cooler C', the cock $a$ being open and the cock $a'$ being closed. Instead of carrying the liquid from the cooler into a chip-cask I may carry it after cooling back again into tub A through pipe C, cocks $c$ and $c'$ being closed and cock $c^2$ being open. After the yeast has settled into the bottom of tub A, I carry the liquid through pump B, cooler C', and into filter D through pipe $d$, cocks $a$ and $c^2$ being closed and $a'$ and $c'$ being open. From the filter I carry the liquid through $d'$ into cask E, situated in a warmer cellar, where it is subjected to a warmer temperature to complete the fermentation by the finely-divided yeast left in the liquid.

When I am ready to place the beer upon the market, I again cool it and filter it, which places it in condition for shipping. The beer treated by the old processes when placed upon the market, and thereby coming into a warmer temperature, frequently undergoes another fermentation. With my process, as the beer has undergone a fermentation in a warm temperature, there is little possibility of its fermenting again after being placed upon the market.

What I claim is—

1. The process of treating wort which consists in subjecting it to two fermentations, the first one being checked by cooling and the second one taking place in a warmer temperature after partial filtration, substantially as shown and described.

2. The process of treating wort which consists in allowing fermentation to take place for only a short while after it has been placed in contact with yeast, then checking the fermentation by cooling, then separating the yeast from the wort, leaving yeast only in a finely-divided state in the wort, and then placing the wort in a warm temperature under pressure to create therein the necessary gases.

3. The process of treating wort which consists in first placing it in contact with yeast and allowing it to ferment a short while; second, checking the incomplete fermentation by cooling; third, fining and clarifying in the cool state; fourth, filtering it, leaving finely-divided yeast floating therein; and fifth, placing it inclosed in a vessel in a warm temperature to ferment a second time to create the necessary gases.

HENRY E. DECKEBACH.

Witnesses:
W. F. MURRAY,
A. McCORMACK.